Sept. 6, 1966  E. H. LYONS, JR  3,271,197
PROCESS FOR PRODUCING ELECTRICITY AND FURNACE
Filed April 24, 1962  2 Sheets-Sheet 2
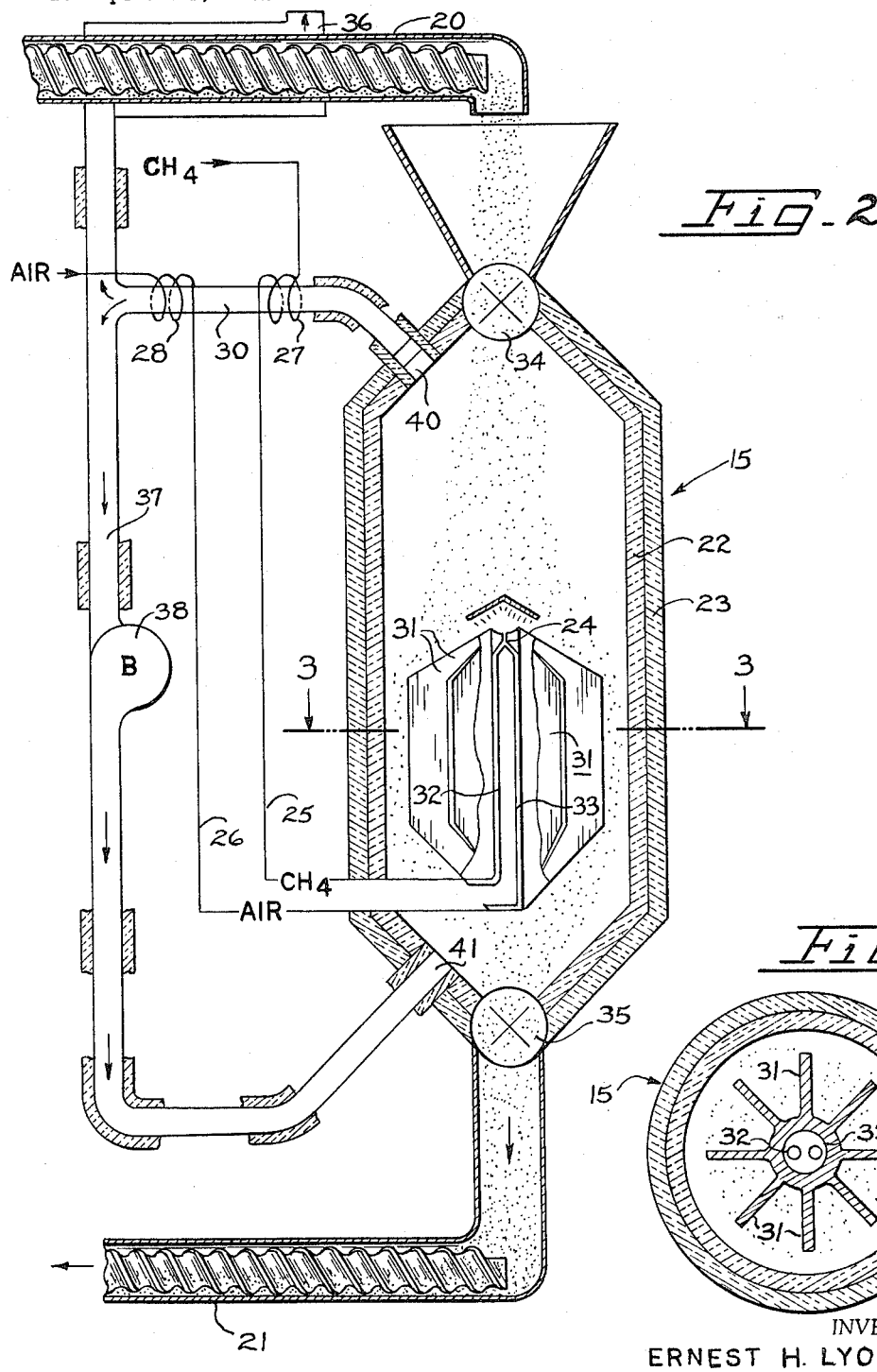
INVENTOR.
ERNEST H. LYONS JR.
BY
Owen, Wickersham & Erickson
ATTORNEY

United States Patent Office 3,271,197
Patented Sept. 6, 1966

3,271,197
PROCESS FOR PRODUCING ELECTRICITY
AND FURNACE
Ernest H. Lyons, Jr., Box 37, Elsah, Ill.
Filed Apr. 24, 1962, Ser. No. 189,784
9 Claims. (Cl. 136—86)

This invention relates to an energy conversion process, and particularly to a process wherein certain higher metal oxides are reduced to lower metal oxides, which, in turn, are reoxidized in an electrolytic cell with an output of electric current. In other words, the net energy conversion is substantially *from* the energy used to reduce the higher oxides *to* the electrical energy produced by the cell.

The present invention is characterized by very high efficiencies of energy conversion. For one thing, the higher oxide is reduced partly by heat at a high temperature, while the electric cell is operated at a much lower temperature. This can be done in a way that enables a close approach to the theoretical Carnot-cycle efficiency in the neighborhood of 70% to 90%. Just as important, the reduction is accomplished in part by *chemical* reduction, so that to this extent the process is removed from the Carnot cycle. In brief, the heat is supplied by burning fuel in a way that gives accompanying chemical reductive action.

The present invention differs from direct fuel cells in that the conversion is indirect; and it differs from indirect fuel cells heretofore known in the art both by its use of certain metal oxides and by novel features in the regeneration step which combines thermal dissociation with reduction by a chemical reducing agent, namely, the fuel or a partly oxidized product thereof.

Among the objects of the invention are: to provide a very high efficiency energy-conversion process at a regeneration or reduction furnace; to provide a cyclic energy conversion system in which certain basic materials are reutilized repeatedly; and to provide an unusually efficient use of both heat and chemical energy as part of a process for generating direct-current electricity.

Other objects and advantages of the invention will appear from the following decsription of some prefered embodiments thereof.

In the drawings:

FIG. 2 is a view in elevation and partly in section of a furnace embodying the principles of the invention.

FIG. 3 is a view in section taken along the line 3—3 in FIG. 2.

Figure 1:
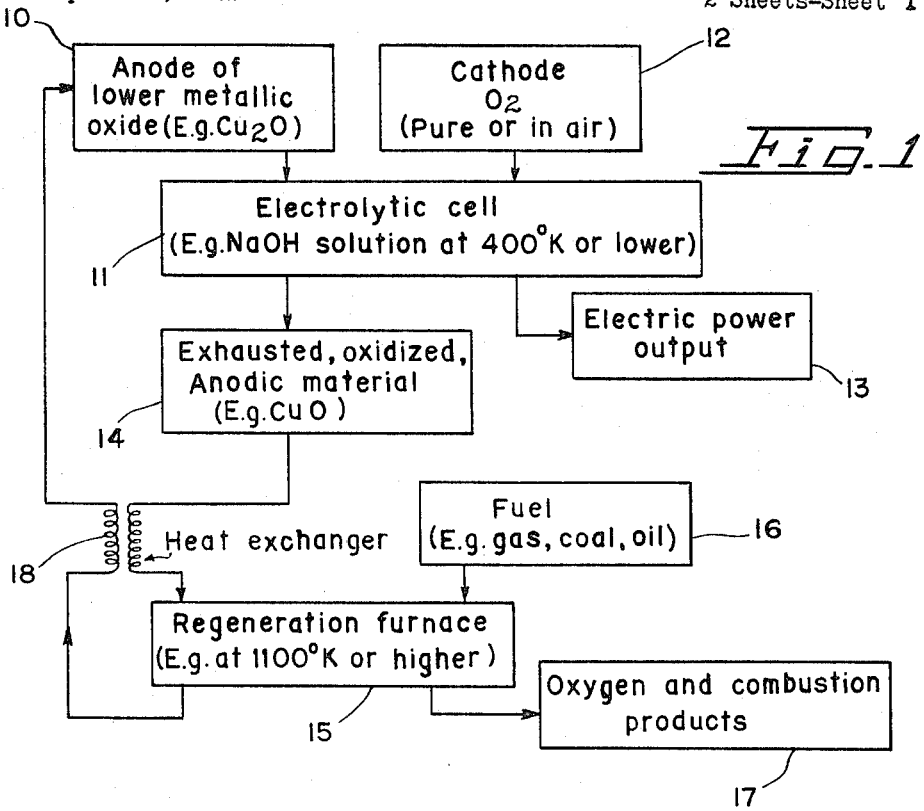
FIG. 1 is a flow sheet of a process embodying the principles of the invention.

The cycle, which is disclosed and claimed in my copending patent application, Serial No. 840,196, filed September 15, 1959, now U.S. Patent No. 3,100,163, is illustrated by the flow sheet, FIG. 1, of a typical process according to the invention. An anode 10 of a lower metallic oxide, such as cuprous oxide, is immersed in an electrolytic cell 11. The electrolyte is preferably basic (e.g., sodium or potassium hydroxide solution), but it may be a solution of a mineral acid or of a salt thereof, provided that the oxides concerned are not excessively soluble therein. The electrolyte is preferably relatively cool or at any rate below 400° K. An oxygen cathode 12 completes the cell, which produces electric power 13 while oxidizing the anode 10.

Exhausted oxidized anodic material 14, such as cupric oxide, is withdrawn from the cell 11 and treated according to the principles of the present invention in a regeneration furnace 15, preferably about 500° K. or typically at about 1100° K.; however, for regenerating by thermal dissociation that part of the cupric oxide which is not reduced by reacting with the fuel or its reaction products, a temperature of 1500° K. is preferred, so that the furnace 15 may be operated at that temperature when conditions do not result in the desired degree of reduction at lower temperatures. Both heat and chemical action are supplied by a fuel 16, preferably natural gas, petroleum, or some other suitable reducing fuel that is not unduly expensive. The furnace 15 therefore reduces the cupric oxide or other exhausted anodic material, with resultant escape of oxygen and the combustion products, if any, shown at the box 17. The regenerated material then is cooled and reused as the anode 10. It may be cooled, partially at least, by heat exchange at 18 with the exhausted anodic material 14, thereby reducing fuel cost and gaining further in efficiency. At the same time, any remaining water is evaporated from the material 14.

The keys to this particular process are (1) the choice of the repeatedly regenerated material (e.g. $Cu_2O \rightleftarrows CuO$), (2) the regeneration at high temperature by both heat and chemical action, (3) the use of the cell at a temperature much lower than that used for regeneration, (4) a cheap source of oxygen for the cathode, (5) holding down heat losses at the regeneration step by careful furnace construction and by use of the heat exchanger 18. In place of the copper oxide cycle, some other metal oxides may be used: lead oxides, manganese oxides, iron oxides, and cobalt oxides.

The present invention is concerned particularly with the regeneration (reduction) portion of the cycle. Here, as said, there is both reduction by heat and also chemical reduction. In this discussion, the term "chemical" signifies reduction by direct reaction with the fuel or its partially oxidized products, as distinguished from simple thermal dissociation, although, strictly speaking, both are really chemical reactions. Thus, the heat reduction reaction may be illustrated by the equation

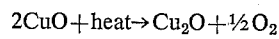
$$2CuO + heat \rightarrow Cu_2O + \tfrac{1}{2}O_2$$

The chemical reduction reactions with methane may be represented by the equations:

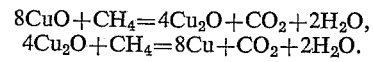
$$8CuO + CH_4 = 4Cu_2O + CO_2 + 2H_2O,$$
$$4Cu_2O + CH_4 = 8Cu + CO_2 + 2H_2O.$$

With intermediate combustion products of the fuel (using CO as an example), there are such equations as:

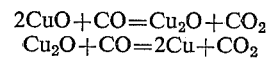
$$2CuO + CO = Cu_2O + CO_2$$
$$Cu_2O + CO = 2Cu + CO_2$$

If the fuel is coal, most of the reaction will occur with CO, but a little may occur with solid C:

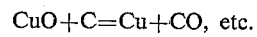
$$CuO + C = Cu + CO, \text{ etc.}$$

In the case of fuel oil, higher hydrocarbons will behave in reactions analogous to those with $CH_4$.

These reactions proceed at considerably lower temperatures than the thermal decomposition, and may occur (1) in the zone where unregenerated oxides (CuO, etc.) strike the hot gaseous combustion products, which, inevitably, contain a small percentage of CO, and possibly other products of incomplete oxidation; and (2) in the zone where hot regenerated oxides (which always contain a portion of unregenerated material) strike the base of the flame, where there is a relatively high concentration of unoxidized fuel. Furthermore, when the lower oxide ($Cu_2O$, etc.), whether produced by thermal or by chemical regeneration, strikes partially or fully unburned fuel, a partial reduction to metal occurs.

Chemical regeneration usually proceeds straight through the lower oxide state to the metal. This is advantageous, provided that the metal remains in a finely divided, electrolytically active state, so that it can readily be electrolytically oxidized in the cell. The presence of metal gives increased voltage and increased power yield compared to an equal amount of oxide which has been subjected to thermal regeneration alone, and consequently contains no metallic copper, for example. Furthermore, energy converted into power by means of a cycle embracing chemical regeneration escapes the limitation of the Carnot cycle, and the combined process therefore has a higher over-all theoretical efficiency than the Carnot figure.

On the other hand, reliance cannot be placed on chemical regeneration alone, in part because a portion of the fuel must be burned to maintain the necessary temperature for chemical reduction, in part because the chemical reduction proceeds too slowly unless the temperature is raised so high that the efficiency drops, and in part because the product is not electrolytically active and does not function satisfactorily as an anode material.

The most effective cycle combines chemical and thermal regeneration so that between about 5% and 80% of the oxide is regenerated chemically, the remainder being regenerated thermally. An important point is the marked advantage of the mixed regeneration over straight chemical regeneration. The most favorable ratio depends on furnace design, the particular oxide being used, the design of the cell, and the type of fuel.

The regenerator furnace 15 of this invention combines the heat exchanger and regenerator and employs a recycle in a way which is unique, because of the evolution of oxygen in the effluent gases. Calculations on furnaces may usually be regarded as fairly reliable, thanks to the experience of nearly a century, and these indicate a probable efficiency for the furnace of more than 94%.

In general, the furnace 15 resembles (except for the novel features noted below) a common lime kiln, which gives long periods of service, and the oxides used in this invention are less corrosive than lime. The oxides are delivered to the furnace 15 through a transfer line 20 at temperatures usually not exceeding 200° F., and are carried back to the cell through a transfer line 21 at temperatures usually not exceeding 300° F. At these low transfer temperatures steel is quite serviceable for use in the transfer lines. Using well-established formulas given in Kent's "Engineering Handbook," for a screw type conveyor, the power required does not exceed 0.5% of the output, assuming that three pounds of unreacted oxide or inert carrier are moved for every pound which produces power in the cell. Screw conveyors need not be used, for other types of transfer apparatus require even less power.

The furnace is insulated more completely than is customary, having fire brick walls 22 surrounded by insulation 23. In the furnace 15 itself the hot oxides have contact only with the fire brick 22, which is not seriously attacked by copper oxide even at considerably higher temperatures than those at which the furnace is operated. There are also small areas of contact with a nozzle 24 at which the fuel and air enter, but this problem is common to many types of furnaces and does not offer serious difficulties.

The furnace 15 shown in FIGS. 2 and 3 ordinarily need be no higher than about 20 or so feet for the complete recycle of the oxides concerned. Conventional heat exchangers would need to be about five times as long.

The combined regenerator and heat exchanger 15 of FIGS. 2 and 3 is shown fired by natural gas. Both the gas line 25 and the air line 26 preferably pass to the nozzle 24 through heat exchanger portions 27 and 28 in heat-exchange relation with a recycle-exhaust line 30. The design features are intended to put the maximum possible heat developed by burning the gas into the copper oxide. Fins 31 preferably surround a substantial height of internal lines 32 for gas and 33 for air, to heat them further by contact with the regenerated falling material.

The oxides enter through a valve 34 at the top and leave through a valve 35 at the bottom, both entering and leaving at a temperature of about 250° F., and the stack gases leave through an exhaust stack 36 at 300° F., and may even be cooled further as they preheat the entering fuel gas and air. There is a recycle line 37 with a blower 38, connecting an outlet 40 with an inlet 41 at the bottom of the furnace, supplying heat on recycle. This means that losses up the stack can be confined to about 3–5%. This is almost unheard of in ordinary furnaces; 85% efficiency is very seldom attained.

A unique feature of the regenerator-heat exchanger 15 is the use of a portion of the oxygen evolved in the regeneration, for combustion of the fuel. To the extent that the oxygen available from regeneration of copper oxide supplies, through combustion, the heat needed for regeneration, the furnace 15 can be operated on a closed cycle without the addition of air. Carbon dioxide and steam are removed without large consumption of heat. To this extent, the heat losses can be cut, at least in principle, to those involved in removing carbon dioxide and steam.

In practice it is necessary to add some air, and to waste a fraction of the product gases up the stack. However, this can be regulated so as to keep the carbon dioxide content of the recycle gas to a reasonable figure, and the amount of air needed is only a fraction of that which would be required if the added air were the only source of oxygen for combustion, as is the case in other furnaces. Since less air needs to be added, less nitrogen enters with it, less nitrogen has to be heated, less nitrogen goes up the stack, and less heat is carried out in exhausted nitrogen. Therefore, substantially higher furnace efficiencies can be expected than have been accessible heretofore.

While the idea of various types of recycle is old, it is new for the recycle gas to contain so much oxygen that one can markedly reduce the amount of air which would otherwise be required. This is the result of the fact that oxygen is produced in the furnace.

The system is not, of course, confined to using natural gas; oil or powdered coal can be used by insertion of a combustion chamber to avoid mixing unburned fuel with the copper oxides.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In an energy conversion process where a lower metallic oxide is oxidized as an anode in an electrolytic cell with the production of electrical energy and the resultant higher metallic oxide is regenerated, a process wherein said higher metallic oxide is introduced to and caused to flow downwardly in a regeneration zone wherein a fuel is burned in said zone with oxygen to supply heat for reducing said higher metallic oxide, largely to said lower metallic oxide with the resultant production of oxygen, the combustion products and most of the produced oxygen being exhausted from said zone at a locus distant from the point where the fuel is burned, and wherein a major amount of the oxygen so produced is recirculated to said zone and flowed through said zone countercurrently to said oxide and through the point where the fuel is burned, to supply a substantial portion of the oxygen needed for burning said fuel and to conserve the heat produced by burning said fuel and needed to produce the reduction of said higher metallic oxide, whereby the thermodynamic efficiency in said zone is markedly increased.

2. The process of claim 1 wherein said recycled exhaust portion is used in heat exchange relation with incoming fuel and air to further increase the efficiency of the operation.

3. The process of claim 1 wherein a non-recycled exhaust portion is used in heat-exchange relation with incoming higher metallic oxide to heat the latter and cool said non-recycled exhaust portion to further increase the efficiency of the process.

4. The process of claim 1 wherein fuel and outside air are brought into a lower portion of said regeneration zone and are subjected to heat exchange in it as they move upwardly to warm them before they are mixed together and burned.

5. In an energy conversion process where a cuprous oxide is oxidized as an anode in an electrolytic cell with the production of electrical energy and the resultant cupric oxide is regenerated, a process wherein said cupric oxide is introduced near the upper end of a regeneration zone in which a fuel is burned with oxygen to supply heat for reducing said cupric oxide, with production of oxygen, the combustion products and most of the produced oxygen flowing countercurrently to said cupric oxide and being exhausted from said zone near said upper end, and a large proportion of the oxygen so produced being recirculated from near said upper end to a lower portion of said zone and flowed upwardly used for burning said fuel and for conserving the heat produced in said zone, thereby markedly enhancing the thermodynamic efficiency in said zone.

6. The process of claim 5 wherein the non-recycled exhaust gases are used in heat-exchange relation with incoming cupric oxide to heat the latter.

7. In an energy conversion process where a lower metallic oxide is oxidized as an anode in an electrolytic cell with the production of electrical energy and the resultant higher metallic oxide is regenerated, a process wherein said higher metallic oxide is introduced in a fluidized state to the upper end of a regeneration zone and falls down therethrough, a fuel is burned in oxygen to supply heat moving upwardly for reducing said fluidized falling higher metallic oxide, with the resultant production of oxygen above the level where the fuel is burned and flowing countercurrently to the oxide, the combustion products and most of the produced oxygen being withdrawn from near the upper end of said zone, a large proportion of said hot withdrawn combustion products and the produced oxygen mixed therewith being conducted to a lower portion of said zone and there reintroduced to flow upwardly countercurrently to the falling oxide, the said produced oxide then being used to help to burn said fuel and the heat in said withdrawn products being used to promote the reduction action in said zone, some of the oxygen needed for burning said fuel being supplied to said zone as air but in quantity less than is needed to burn the fuel, were it not for the production of oxygen in the zone.

8. The process of claim 7 wherein a non-recycled exhaust portion is used in heat-exchange relation with incoming higher metallic oxide to heat the latter and cool said exhaust portion.

9. A regeneration oxide-reduction furnace, comprising a generally cylindrical well-insulated vertically extending housing having at its upper end a first opening for exhausting combustion products and a second opening for introducing a material to be treated to the upper end of said furnace, said second opening including a valve, means for feeding said material to said second opening, a fuel-air nozzle in said housing having fuel and air inlet pipes, said pipes being provided with heat exchange means for heating the incoming fuel and air and for resultant cooling of the regenerated product, the lower end of said housing including means for removing said material and a recycle opening, conduit means connecting said first opening to said recycle opening near the bottom of said housing for recycling a portion of the exhaust gases, said conduit means conveying said portion of exhaust gases to said heat exchange means where said exhaust gases help to heat said incoming fuel and air, and means in heat-exchange relationship with said feeding means, and conduit means for conveying another portion of said exhaust gases from said first opening to said heat exchange means.

References Cited by the Examiner

UNITED STATES PATENTS

| | | | |
|---|---|---|---|
| 569,591 | 10/1896 | Short | 136—84 |
| 2,570,543 | 10/1951 | Gorin et al. | 136—84 |
| 2,830,109 | 4/1958 | Justi et al. | 136—86 |
| 3,009,327 | 11/1961 | Weil | 136—86 X |
| 3,031,518 | 4/1962 | Werner et al. | 136—86 |
| 3,100,163 | 8/1963 | Lyons | 136—86 |
| 3,146,131 | 8/1964 | Linden et al. | 136—86 |

FOREIGN PATENTS

| | | |
|---|---|---|
| 5,695 | 11/1882 | Great Britain. |
| 8,906 | 4/1896 | Great Britain. |
| 469,512 | 7/1937 | Great Britain. |
| 731,527 | 6/1955 | Great Britain. |

OTHER REFERENCES

Journal Electrochemical Soc., vol. 104, June 1957, pp. 379–386.

Mellor: Comprehensive Treatise on Inorganic and Theoretical Chemistry, volume 3, page 118.

WINSTON A. DOUGLAS, *Primary Examiner.*

JOHN R. SPECK, JOHN H. MACK, *Examiners.*

H. FEELEY, A. B. CURTIS, *Assistant Examiners.*